Oct. 25, 1932.  J. POLLOCK  1,884,207
FAUCET
Filed Dec. 4, 1931
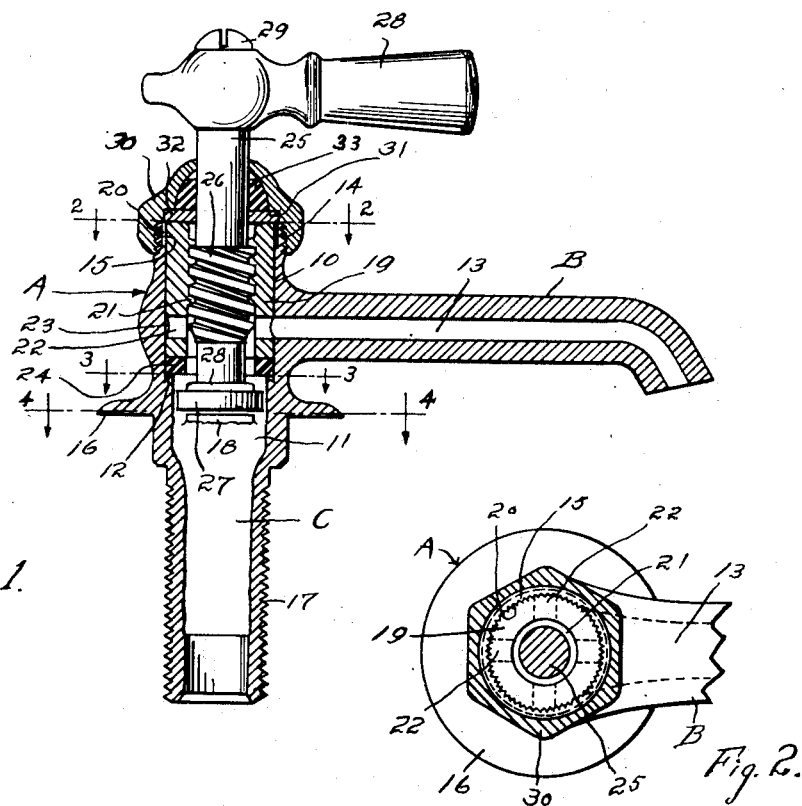
Fig. 1.
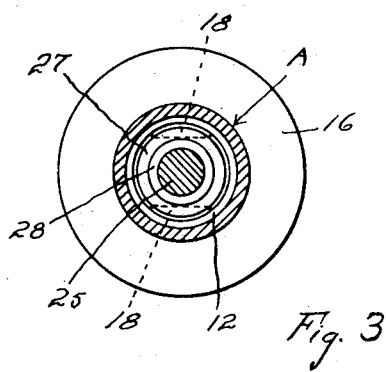
Fig. 2.
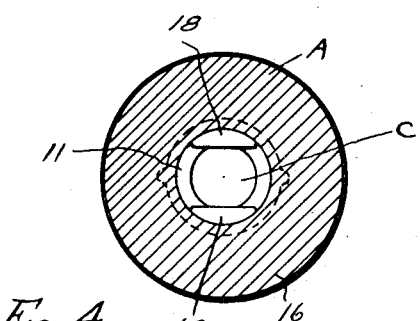
Fig. 4.
Fig. 3.
Inventor
Julius Pollock
By Hull Brock + west
Attorney Patented Oct. 25, 1932

1,884,207

UNITED STATES PATENT OFFICE

JULIUS POLLOCK, OF CLEVELAND HEIGHTS, OHIO, ASSIGNOR TO THE REPUBLIC BRASS COMPANY, OF CLEVELAND, OHIO, A CORPORATION OF OHIO

FAUCET

Application filed December 4, 1931. Serial No. 579,016.

This invention relates to a faucet or spigot designed particularly for use in ordinary household plumbing appliances but adapted for a variety of uses of analogous nature.

The principal object is to provide such a device which is peculiarly free from any tendency to leak, which closes and opens easily and which, embodying these superior features, is nevertheless easily disassembled for inspection, repair or the like. A further object is the provision of a unitary valve or control means in the form of an insert which may be readily placed in and removed from the main casting or body yet having a very tight non-rotating fit therewith. A further object is the provision of a novel means for securing the gasket or washer in sealing relation.

I attain the foregoing and other and more limited objects in and through the combination of elements and arrangement of parts hereinafter described and illustrated in the accompanying drawing, in which Fig. 1 is a vertical sectional view; Fig. 2 is a section on the line 2—2 of Fig. 1; Fig. 3 is a section on the line 3—3 of Fig. 1; and Fig. 4 is a section on the line 4—4 of Fig. 1.

Referring now to the accompanying drawing, the numeral A indicates generally the body member shown as provided with a spout B and a central opening C. The opening C consists of an upper portion 10 and a reduced lower portion 11 connected by a shoulder 12 having a sharp edge, that is, being higher at its juncture with the reduced portion 11 than at its juncture with the larger portion 10. The spout B is provided with an opening 13 communicating with the portion 10 of the central opening C. At its extreme upper end the body A has exteriorly a threaded portion 14 and interiorly a corrugated portion 15. The body A may also be provided with a flange 16 for engagement with a washbowl or similar fixture and an elongated externally threaded shank 17. Within the portion 11 of the opening C are a pair of projections 18, each of which may extend approximately one-fourth of the distance around the opening. The upper faces of these projections are preferably finished.

Received within the portion 10 of the opening C is an insert 19 fitting snugly therewithin and provided with upper brooched corrugations 20, having an internally threaded central opening as indicated at 21 and having a plurality of radially extending openings 22 communicating with the threaded central opening thereof and so positioned as to register with the opening 13 in the spout B. Encircling the insert 19 is a groove or depression 23 placed at the level of the radial openings 22 whereby even though only one of said openings may be in registration with the passage 13, fluid passing through the others may be admitted thereto. It will be noted by reference to Fig. 2 that the opening or passage 13 communicates with the portion 10 of the opening C over a sufficiently wide range that it is impossible to place the insert in such position as to cut off communication between the same and all of the openings 22. Clamped between the sharp edge of the shoulder 12 and the lower end of the insert 19 is a gasket 24 of annular shape. The central opening in this gasket may be of the same diameter as the opening in the insert 19 although it is not necessarily the same. This gasket is preferably made of relatively hard composition, such as fiber, semi-hard rubber or the like.

Extending through the insert 19 is a valve stem 25 provided with a threaded portion 26 and a head 27. Integral with the head 27 is a shoulder 28 of a size substantially equal to the opening in the gasket 24. The valve stem carries at its upper end an operating handle 28 which is non-rotatably secured to the stem 25 as by interfitting projections or keyways and held in place thereon by a screw 29.

A clamping nut 30 engages with the threaded portion 20 of the valve body A and through the medium of the fiber washer 31 bears upon the upper end of the insert 19 having a shoulder 32 overlying the edge of such washer. The nut 30 also serves the purpose of confining a packing 33 which surrounds the valve stem 25.

From the foregoing, it will be apparent that the gasket 24 will be tightly clamped in sealing relation against the sharp edge of the shoulder 12 when the insert is forced into position. Upon closing movement of the valve stem the shoulder 28 will enter the opening in the gasket 24, substantially cutting off the flow of water but allowing a sufficient passage to prevent water hammer. A further movement in closing direction causes the head 27 to engage against the lower surface of the gasket 24 to effect complete closing. When the valve stem is rotated to bring the head 27 into contact with the gasket 24, there is a tendency to move the stem downwardly with respect to the insert 19, but after such contact has been established the pressure of the water against the valve head 27 will tend to force the same more tightly against the gasket, thereby tending to urge the valve stem in an upward direction with respect to the insert. It will thus be seen that the very slight play or lost motion which may exist between the insert 19 and the threaded portion 26 of the valve stem will tend to allow a more tight closing of the valve by water pressure if the closing movement is not sufficient to put the necessary pressure thereon. In any event, the closing pressure exerted by the screw will be reinforced by the water pressure acting upon the valve head 27. In the event it becomes necessary to remove the insert 19 and associated parts, it is only necessary to loosen the nut 30 and rotate the handle 28 excessively in valve opening direction. This results in engagement by the head 27 of the projections 18 and then forces the insert upwardly against the resistance of the tight frictional grip at the contact of the corrugations 15 and 20.

Having thus described my invention, what I claim is:

1. A faucet including a body having an opening therethrough, a shoulder formed on said body and extending around said opening, an annular gasket resting on said shoulder, an insert axially slidable but non-rotatably received within said opening and confining said gasket between itself and said shoulder, removable means for securing said insert against axial movement in said opening, a valve stem threaded through said insert and carrying a head adapted to engage said gasket, and a projection on said body adapted to be engaged by said head upon excessive opening movement of said valve stem for assisting in the removal of said insert.

2. In a faucet, a valve body having an opening therethrough, a shoulder formed within said body, an insert received within said opening, a gasket confined in sealing relation between said insert and said shoulder, said body member having a corrugated portion on its inner surface, said insert having a corrugated portion on its outer surface adapted to interfit with the first said corrugated portion, a valve stem threaded through said insert and extending through said gasket and carrying a valve head adapted to engage against said gasket, and one or more projections on the interior of said body member adapted to be engaged by said valve head upon excessive opening movement of said valve stem whereby to force said insert out of said body portion, said insert being provided with one or more openings for allowing passage of fluid therethrough.

3. In a faucet, a valve body having an opening therethrough, a shoulder formed within said body member, an insert received within said opening, a gasket confined in sealing relation between said insert and said shoulder, said body member having a corrugated portion on its inner surface, said insert having a corrugated portion on its outer surface adapted to interfit with the first said corrugated portion, a valve stem threaded through said insert and extending through said gasket and carrying a valve head adapted to engage against said gasket, and one or more projections on the interior of said body member adapted to be engaged by said valve head upon excessive opening movement of said valve stem whereby to force said insert out of said body portion.

In testimony whereof, I hereunto affix my signature.

JULIUS POLLOCK.